L. C. PRITNER AND L. S. PAUL.
TIRE CARRIER.
APPLICATION FILED AUG. 2, 1919.
1,331,124.
Patented Feb. 17, 1920.
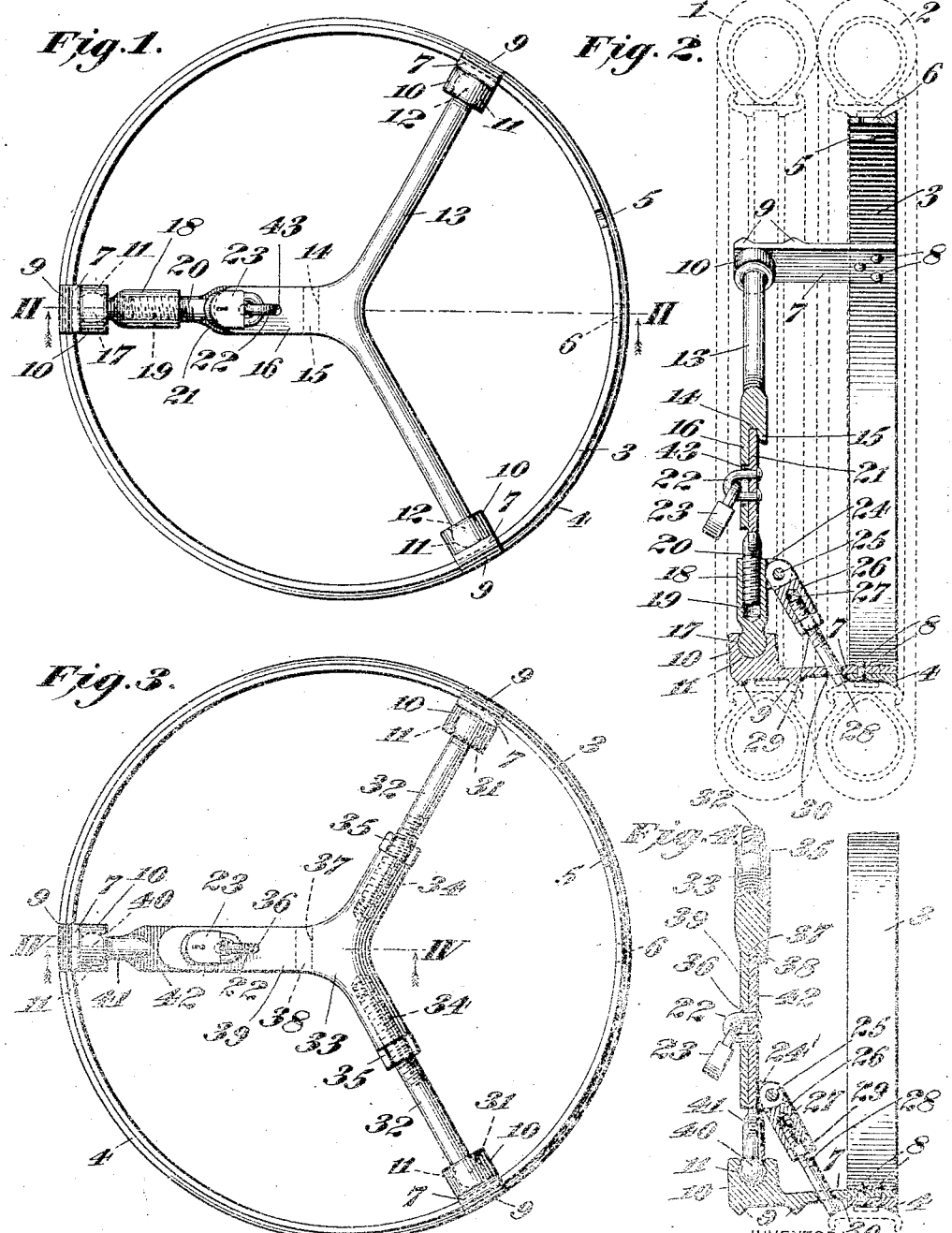
INVENTOR
Lindsay C. Pritner
Lewis S. Paul, and
BY
Geo. E. Thackray
ATTORNEY

UNITED STATES PATENT OFFICE.

LINDSAY C. PRITNER AND LEWIS S. PAUL, OF JOHNSTOWN, PENNSYLVANIA.

TIRE-CARRIER.

1,331,124.  Specification of Letters Patent.  Patented Feb. 17, 1920.

Application filed August 2, 1919. Serial No. 314,913.

*To all whom it may concern:*

Be it known that we, LINDSAY C. PRITNER, and LEWIS S. PAUL, citizens of the United States, and residents of the city of Johnstown, in the county of Cambria and State of Pennsylvania, have invented certain new and useful Improvements in Tire-Carriers; and we do hereby declare the following to be a full, clear, and exact description of the invention, such as will enable others skilled in the art to which it appertains to make and use the same.

Our invention consists of a tire carrier adapted to hold and carry one or more pneumatic tires, and is preferably secured to the rear or other portion of a pneumatic tired vehicle. Our invention consists generally of a flat elastic ring of metal, adapted to be slightly sprung outwardly from its normally conical shape to a more nearly cylindrical form or vice-versa, and to said ring we attach brackets extending outwardly therefrom, which brackets are provided with outwardly projecting lugs adapted to receive the rim of a pneumatic tire and hold same in position on the carrier. Means are also provided for contracting the rim and extension brackets for expanding the same, whereby the tire rims with or without the tires thereon can be easily put in place and secured by said expansion and can be removed by the contraction of the holding portions.

Having thus given a general description of our invention, we will now in order to make the matter more clear, refer to the annexed sheet of drawings, which forms part of this specification and in which like characters refer to like parts.

Figure 1 is a side elevation of our improved tire carrier; Fig. 2 is a transverse sectional elevation taken on the line II—II of Fig. 1; Fig. 3 is a side elevation of a slightly modified form of our tire carrier; and Fig. 4 is a transverse cross sectional elevation of the slightly modified form of tire carrier shown in Fig. 3 taken on the line IV—IV and looking in the direction of the arrows.

Referring now to the various numbers of reference on the drawings:—1 is the outer tire and 2 is the inner tire held by our carrier, these tires being mounted on rims as usual. One of the main members of the tire carrier is an annular ring 3 which is preferably provided with a beveled or flanged edge 4, projecting outwardly therefrom, as illustrated, in order to form a stop and support for the tire rim. 5 is a notch in the ring 3 to receive the tire stem, 6 is a hole in the ring 3 to receive the boss on the rim, as some rims are provided with such bosses in order to secure them on the felly. To the ring 3 are secured three extension brackets 7 by means of the rivets 8, these rivets being countersunk on the outside, so that the rim 3 is smooth on its outer surface. The extension brackets are provided with outwardly extending lugs 9 adapted to form stops and abutments for the tire rims and hold them in place when the brackets are radially extended against said rim. Each of the extension brackets 7 is provided with an outer head 10 which has an approximately spherical socket 11 formed therein, as illustrated, adapted to receive the ball 12 on the end of the strut rods 13 or the locking post 18. The strut rods 13 are preferably arranged at the angle shown and merge into the inner member 16, which is preferably formed flat, as illustrated, and provided with a recess 14, bounded on one side by the longer lug 16 and on the other side by the short projection 15, thus forming the socket or recess. In addition to the foregoing, we provide an adjustable locking post 18, which has a ball 17 on the end thereof seated in the socket 11, the locking post 18 having in it an internal screw thread 19 into which is fitted a screw threaded bolt or adjustable extension 20, having a flat portion 21, to which is secured the staple 22, which is adapted to project through the slot 43 of the member 16 and be secured in position by the pad-lock 23. The locking post 18 is provided with ears 24 extending rearwardly from same, to which is pivoted the clamping arm 26 by means of the hinge bolt 25, while 27 is the internally screw threaded socket in the clamping arm 26. Within this screw threaded socket is mounted an externally screw threaded extension 28, which is adapted to be adjusted in length by means of said screw threaded extension and secured in place by the lock nut 29. A hole 30 is provided in the lower extension bracket 7 through which the extension member 28 is passed to guide it in position and the end of the extension 28 is adapted to contact with the rim of the inner tire and hold it in position in case only one tire is on the carrier.

Referring now to Figs. 3 and 4, 31 are partial balls on the ends of the strut rods 32, while 33 is the central member which is shown with its various supports extending approximately at angles of 120 degrees. Two of the portions of the central members are provided with internal screw threads 34 into which are screwed the struts 32, which are also provided with locking nuts 35 to secure them in position when their length has been adjusted to suit the dimensions required. The central member is provided with a slot 36 and a socket 37, which socket is bounded on one side by the longer outer portion 39 and on the other side by the short projection 38. 41 is the locking post which is pivoted to the extension bracket by means of the ball 40, which fits in the socket 11 of the head 10, and 42 is the flat extending portion of the locking post 41.

Attached to or formed integral with the locking post 41 is the ear 24' to which is pivoted the internal locking or clamping arm 26.

The operation of our tire carrier is as follows: Assuming the parts to be in position as shown in the drawings, the pad-lock is removed, the portions 16 or 39 are grasped by the hand and pulled outwardly, whereupon the ring 3 contracts elastically to its normal slightly conical form and the inner ends of the extension brackets spring toward the center of the carrier in such a way that the diameter of same is reduced, permitting the rims and tires to be removed, and by a reverse operation one or two tires can be placed on the carrier. It will thus be seen that the rim 3 and the extension brackets are adapted to be extended or contracted either to hold or to loosen a tire and the operation is extremely simple, only requiring one movement. In case any adjustments are required to make the rims tight on the carrier, this can be accomplished by shortening or lengthening the strut members 32 by means of their screw ends which are then locked in position by means of their lock nuts, and as illustrated in Figs. 1 and 3, the adjustment would be made by adjusting the length of the locking post 18 by means of its screw threaded extension 20.

Although we have described and illustrated our invention in considerable detail, I do not wish to be limited to the exact and specific details thereof as shown and described, but may use such modifications in, substitutions for, or equivalents thereof, as are embraced within the scope of our invention or as pointed out in the claims.

Having thus described our invention, what we claim and desire to secure by Letters Patent is:—

1. A tire carrier comprising an elastic ring, a plurality of extensions rigidly secured to said ring and projecting outwardly therefrom, and means for shifting the extensions to expand and contract a portion of said ring.

2. A tire carrier comprising an elastic ring, a plurality of extensions rigidly secured to said ring and projecting outwardly therefrom, independent tire-engaging means projecting outwardly from the ring and extensions, and means secured to said extensions adapted to shift said extensions to expand and contract a portion of said ring.

3. A tire carrier comprising an elastic ring, a plurality of outwardly projecting extensions rigidly secured to the inner surface thereof, said extensions being provided with pivot or socket ends, a pair of struts having their ends mounted in two of said sockets so they may be partially rotated, a locking post pivotally secured to another one of the extensions and adapted to form a knuckle or toggle joint with the aforesaid struts adapted to radially expand said ring and extensions when closed and to allow them to contract when open.

4. A tire carrier comprising a flat elastic band, a plurality of extensions projecting outwardly therefrom and provided with radially extending lugs on the outer surfaces thereof, two adjustable struts pivotally secured near the outer ends of two of said extensions and adjustably secured by their threaded ends within a center member, said central member being provided with an extension having a longer leg on the outside and a shorter projection on the inside, forming a recess between same, a locking post pivotally secured to the other extension member and having a portion adapted to fit in and coöperate with said recess, the lengths of the strut members and locking post being such that when they are closed together the extensions are expanded radially and when opened the elasticity of the band contracts them.

5. A tire carrier comprising a flat elastic band, a plurality of extensions projecting outwardly therefrom and provided with radially extending lugs on the outer surfaces thereof, two adjustable struts pivotally secured near the outer ends of two of said extensions and adjustably secured by their threaded ends within a center member, said central member being provided with an extension having a longer leg on the outside and a shorter projection on the inside, forming a recess between the same, a locking post pivotally secured to the other extension member and having a portion adapted to fit in and coöperate with said recess, the lengths of the strut members and locking post being such that when they are closed together the extensions are expanded radially and when opened the elasticity of the band contracts them, and means for locking same in position.

6. In a tire carrier of the class described, the combination with a flat elastic ring, extensions firmly secured thereto, and a partially rotatable locking post carried by one of said extensions, of a clamping arm pivoted to the locking post and provided with a portion outwardly projecting through one of the extensions toward said ring and being adjustable in length, the end of which is adapted to contact with the tire rim to hold same in position when the locking post is in closed position.

7. In a tire carrier of the class described, the combination with a flat elastic ring, extensions firmly secured thereto, and a partially rotatable locking post carried by one of said extensions, of a clamping arm pivoted to the locking post and provided with an outwardly projecting portion adjustable in length and adapted for engagement with a tire rim mounted on the carrier, one of said extensions constituting means for guiding said clamping arm.

8. A tire carrier comprising an elastic ring, laterally extending members rigidly connected to said ring, and means connected to said members for flexing the same to expand and contract the ring.

9. A tire carrier comprising an elastic ring, laterally extending members rigidly connected to said ring, and means for flexing the members to expand and contract the ring.

10. A tire carrier comprising a ring, laterally extending members carried thereby, means for holding said members relatively immovable, and axially adjustable means carried by the aforesaid means and freely extending outwardly through one of said lateral members for holding a tire rim in position.

In witness whereof we hereunto affix our signatures.

LINDSAY C. PRITNER.
LEWIS S. PAUL.